(No Model.)
J. McDONALD.
MACHINE FOR MAKING DOWEL PINS.
No. 393,253. Patented Nov. 20, 1888.
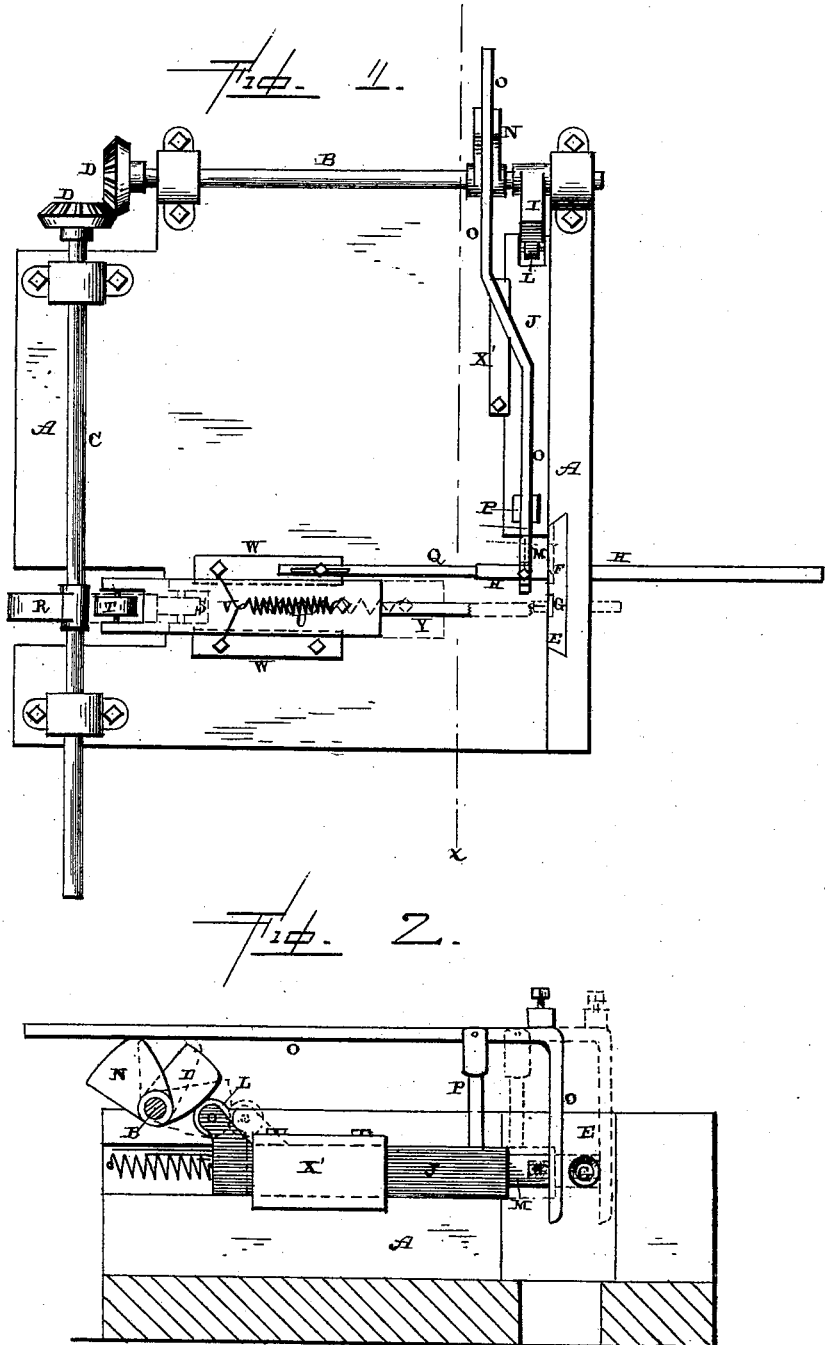
Witnesses. 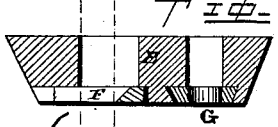 Inventor.
L. J. Gardner Jno. McDonald,
Allen J. Pattison, per F. A. Lehmann,
atty.

UNITED STATES PATENT OFFICE.

JOHN McDONALD, OF ALLENTOWN, PENNSYLVANIA, ASSIGNOR OF ONE-HALF TO EDWARD MARSH, OF SAME PLACE.

MACHINE FOR MAKING DOWEL-PINS.

SPECIFICATION forming part of Letters Patent No. 393,253, dated November 20, 1888.

Application filed April 21, 1888. Serial No. 271,377. (No model.)

*To all whom it may concern:*

Be it known that I, JOHN MCDONALD, of Allentown, in the county of Lehigh and State of Pennsylvania, have invented certain new and useful Improvements in Machines for Making Dowel-Pins; and I do hereby declare the following to be a full, clear, and exact description of the invention, such as will enable others skilled in the art to which it pertains to make and use it, reference being had to the accompanying drawings, which form part of this specification.

My invention relates to an improvement in machines for making dowel-pins; and it consists in, first, the combination of the die-plate through which the end of the stick is forced, the endwise-moving holder which catches the stick after it has been passed through the plate, and a lever which is connected to the holder, with the operating-shaft and a cam by which the lever and holder are operated; second, the combination of two shafts which extend at an angle to each other and are geared together and provided with suitable operating-cams, the endwise-moving holder, the lever bent at its inner end and connected to the holder, the endwise-moving punch, the cutter for cutting off the stick, and the die for shaping it, all of which will be more fully described hereinafter.

The object of my invention is to provide a mechanism whereby a stick is forced through a plate and has its end cut off and is then carried to a finishing-die, through which it is forced and comes out a finished dowel-pin.

Figure 1 is a plan view of a machine which embodies my invention complete. Fig. 2 is a vertical section taken through Fig. 1 on the line X. Fig. 3 is a horizontal section of the die-plate, its cutter, and finishing-die.

A represents a suitable frame-work, upon which are journaled the two shafts B C, which extend at a suitable angle to each other, and which are provided with beveled gears D at their adjoining ends, so as to cause them to revolve together. Inserted in a dovetailed recess in one side of the frame A is the die-plate E, which is provided with the movable cutter F and the finishing-die G. The cutter F, as shown in Fig. 3, has a cutting-edge, against which the stick is forced for the purpose of cutting off its end at each forward movement of the holder M, which catches the stick as it is forced forward and, by pressing it against the sharp edge of the cutter, cuts off the end. The shape of the opening through the die G is made to conform to the shape which the finished dowel-pin is to have. The cutter F and die G are made removable from the plate E, so as to be replaced by others at the will of the operator. The cutter and die are separated but a slight distance from each other, so that after the end of the stick H has been cut off this cut-off end can be moved from the cutter F to the die G.

Upon the shaft B is secured a cam, I, which as the shaft revolves imparts a reciprocating motion to the bar J, which is provided with a friction-roller, L, in its outer end for the cam I to strike against and thus lessen the friction. This bar is held in place by means of a guide, X', which is secured to the inner side of the frame through which the bar J moves. Secured to the inner end of this endwise-moving bar J is the recessed holder M, which consists of simply an endwise-moving bar or rod which has a recess in its end just large enough to catch over the stick and force it against the cutter F, and then carry this cut-off end of the stick to the die G, to be formed into a dowel-pin by being forced through the die and thus given the desired shape. Also secured to the shaft B is the cam N, which strikes against the inner side of the lever O, and which is pivoted in a support, P, which is secured to the top of the endwise-moving bar J. The inner end of this lever is bent, as shown, so as to adapt it to catch over the end of the stick H and thus hold it, in connection with the holder M, for the purpose of moving the cut-off end from the cutter F to the die G. When the stick H is forced through the opening in the plate E, as shown by dotted lines in Fig. 3, the inner end of the stick strikes against the adjustable stop Q, which regulates the length of the dowel-pin, and then, as the cams I N revolve, they force the bar J endwise, so that the holder M will force the stick against the cutter F and thus cut off the end of the stick, and at the same time the lever O, which has its inner end bent, is made to catch tightly against the side of the stick and thus keep it in position in the end of the holder. While the cut-off end of the stick is thus held in the end of the holder, the cams force the holder and lever endwise sufficiently far to bring the cut-off end of the stick just opposite the die G. The bar J is retracted by means of a spring which is connected thereto, or in any way that may be preferred.

Upon the shaft C is secured a cam, R, which as the shaft revolves imparts an endwise reciprocating motion to the punch-box S, which is provided with a friction-roller, T, for the cam to strike against. Secured to this punch-box S is a spring, U, which has its outer end fastened to the rod V, which extends across the top of the punch-box and has its end fastened to the guides W, between which the box moves. To the inner end of this box S is secured a punch, Y, which just as the cut-off end reaches the die G receives an endwise movement through the cam R, and pushes the end of the stick through the die G, from which the finished dowel-pin emerges. The movement of the different parts are so timed that this punch Y moves endwise just in time to catch the end of the stick as it is brought opposite to the die G.

Having thus described my invention, I claim—

1. The combination of the plate through which the end of the stick is forced, the cutter for cutting off the end of the stick, the endwise-moving holder which catches the stick after it has been passed through the plate, and a lever which is connected to the holder, with the operating-shaft and the cams by which the holder and lever are operated, substantially as shown.

2. The combination of the two shafts geared together and provided with the three cams I N R, the endwise-moving holder, the lever bent at its inner end and connected to the holder, the endwise-moving punch, the cutter for cutting off the end of the stick, and the die for shaping it, substantially as set forth.

In testimony whereof I affix my signature in presence of two witnesses.

JOHN McDONALD.

Witnesses:
EDWARD F. GOHEEN,
GEORGE WELTY.